United States Patent

Lindoy et al.

[11] Patent Number: 5,914,044
[45] Date of Patent: Jun. 22, 1999

[54] IMMOBILIZED BRANCHED POLYALKYLENEIMINES

[75] Inventors: Leonard Francis Lindoy, Cranbrook; Peter Lewis Eaglen, Townsville, both of Australia; Robert Louis Alldredge, Denver, Colo.

[73] Assignee: Metre-International Inc., Westminster, Colo.

[21] Appl. No.: 08/765,485

[22] PCT Filed: Jun. 21, 1995

[86] PCT No.: PCT/AU95/00362

§ 371 Date: Dec. 20, 1996

§ 102(e) Date: Dec. 20, 1996

[87] PCT Pub. No.: WO95/35165

PCT Pub. Date: Dec. 28, 1995

[30] Foreign Application Priority Data

Jun. 21, 1994 [AU] Australia ................................. PM6328

[51] Int. Cl.⁶ ............................ B01D 15/04; B01D 15/08
[52] U.S. Cl. ........................... 210/670; 210/638; 210/674; 210/679; 210/684; 210/688; 502/159; 502/164; 502/167; 502/401
[58] Field of Search ........................................ 502/159, 164, 502/167, 401; 210/638, 670, 674, 679, 684, 688

[56] References Cited

U.S. PATENT DOCUMENTS

| 4,071,546 | 1/1978 | Plueddemann | 556/418 |
|---|---|---|---|
| 5,066,395 | 11/1991 | Rameden et al. | 210/198.2 |
| 5,120,443 | 6/1992 | Bruening et al. | 210/638 |
| 5,190,660 | 3/1993 | Lindoy et al. | 210/670 |
| 5,244,856 | 9/1993 | Bruening et al. | 502/158 |
| 5,304,638 | 4/1994 | Marshall et al. | 530/383 |
| 5,334,316 | 8/1994 | Bruening et al. | 210/670 |

FOREIGN PATENT DOCUMENTS

| 0306334A2 | 9/1988 | European Pat. Off. |
| 0480386A1 | 10/1990 | European Pat. Off. |
| 0431324A1 | 11/1990 | European Pat. Off. |

OTHER PUBLICATIONS

Patent Abstract, AU–A–61034/90, Australian Patent Office, Norman B. Rainer, 1990.
Patent Abridgment, AU–B1–26 731/77, The British Petroleum Co., Ltd., 1977.

Primary Examiner—Richard L. Raymond
Attorney, Agent, or Firm—Knobbe, Martens, Olson & Bear, LLP

[57] ABSTRACT

A solid phase ligand removes metal cations from solution. The ligand is a branched polyalkyleneimine having a molecular weight of at least about 400, covalently bound to an inorganic support.

22 Claims, 2 Drawing Sheets

IMMOBILIZED BRANCHED POLYALKYLENEIMINES

This is the U.S. national phase under 35 U.S.C. § 371 of International Application PCT/AU95/00362, filed Jun. 21, 1995.

TECHNICAL FIELD

THIS INVENTION relates to immobilised branched polyalkyleneimines, methods for preparation of such imines, and uses of the imines. Specifically the invention is directed towards solid phase ligands comprising immobilised branched polyalkyleneimines.

BACKGROUND ART

Simple linear amines such as ethylenediamine and diethylenetriamine have long been known as excellent coordinating ligands towards a range of transition and other heavy metal ions. The resulting metal complexes, being metal chelates, are usually significantly thermodynamically more stable than corresponding unidentate amine complexes of, for example, ammonia or methylamine.

In the past, various ligands including linear amines, have been attached to organic polymers supports. However, these are often difficult to synthesise in a manner that maintains the ion co-ordination properties of the ligand because of the inherent lipophilicity of the organic backbone. Organic polymer substrates are generally expensive which tends to make organic-polymer-bound ligands relatively expensive.

Amines have also been attached to inorganic supports. A range of simple amines, including ammonia, ethylenediamine, diethylenetriamine, triethylenetetramine and tetraethylenepentamine have been immobilised by chemically binding them via spacer groups to silicate surfaces to produce insoluble particles that will form complexes with and retain selected cations.

Techniques for binding these simple amines to inorganic supports such as silicon dioxide or silica gel (and other silicon containing substances, including glass), to aluminas and to other insoluble elemental oxides have been described. For example, the amine may be reacted with a spacer group such as (3-chloropropyl)-trimethoxysilane, (3-chloropropyl)-triethoxysilane or a range of other related functionalised alkylsilanes, such that the product is capable of attachment to silicon dioxide via one or more covalent bonds. This is one of several methods for immobilising simple ligands on a solid support. The above reaction sequence may be changed so that the spacer group is first attached to the solid support followed by immobilisation of the amine ligand by reaction with the free terminal group of the spacer. Specifically, the immobilisation of tetraethylenepentamine by this technique is known from Czech Patent No. 177,563 to Vynalezu. Further examples of this type are disclosed in U.S. patents of Bradshaw et al (U.S. Pat. No. 4,952,321), Hancock and Howell (U.S. Pat. No. 4,203,952) and Plueddemann (U.S. Pat. No. 4,071,546). These workers claim the attachment of a number of linear chain derivatives to solid substrates such as silica gel at one end of the linear chain using between one and three bonds to the silica.

Linear polyethyleneimines may be represented by the formula $H_2N[(CH_2CH_2)NH]_nH$ (where n is typically about 7 to 2000). This linear chain material is expected to also bind certain metal ions strongly. A chromatographic column packing for the purification and separation of anions and more specifically, anionic protein species has been described in Ramsden, U.S. Pat. No. 4,450,486. This patent discloses the preparation of a product that consists of linear non-crosslinked polyethyleneimine bound by a silane reagent to silica gel. The product, however, is limited to the use of silica gel having an average particle diameter of about three to seventy microns.

A related disclosure is found in European Patent No. 403,700 to Crane and Kakodkar, in which linear non-crosslinked polyethyleneimine of molecular weight 400 to 1800, is covalently bound to a silica-based solid-phase support. This product serves as an affinity chromatography matrix. The preparation of surface modified silica materials for use as ion-exchangers is disclosed in Jansen et al., "Absorption of Proteins on Porous and Non-Porous Poly (ethyleneimine) and tentacle-Type Anion Exchangers (Journal of Chromatography, vol. 522, 1990, 77–93).

A known application of immobilised simple linear amines is the retention by complexation of ions, such as the generally toxic ions of bismuth, cobalt, chromium, copper, gold, iron, lead, mercury, nickel, radium, silver, tin and zinc, at small concentrations of these ions, even in parts per billion, while not appreciably complexing the low toxicity ions of sodium, potassium, calcium and magnesium at concentrations even thousand of times greater. Because the immobilised-ligand capacity is not consumed by the low toxicity ions, the loading-cycle time will be longer (or less material will be needed) than if both the "unwanted" and the "low toxicity" ions were removed together.

For applications of the above type it is desirable to bind the amine ligand to larger particles of silica gel than, for example, taught in the Ramsden patent.

Larger particles enable the immobilised material to be employed in applications requiring a lower pressure drop access and packed column than can be achieved with smaller particles.

The use of coarse solid support particles, larger than those mentioned in the Ramsden patent, is expected to produce less satisfactory results when bound to large amines such as polyalkyleneimines. Such coarse support particles will have lower effective surface area, per unit weight of support, for attachment of the polyalkyleneimine. In some cases, especially when the molecular weight of the polyalkyleneimine is about 50,000, the product is a gummy mass that has even lower complexation capacity, due to the adherence between particles. Some or all of these problems may account for the general belief in the art that large amines must be bound to relatively small support particles.

A further difficulty with using inorganic materials having hydroxyl groups as the support is that they are highly susceptible to degradation in alkaline conditions. Silica gel is particularly susceptible to degradation. It is known that immobilised linear polyalkyleneimines are not completely stable and over time will lose their ion complexing ability. While not wishing to be bound by theory, it appears that the silica gel support can still be attacked by hydroxides even when coated with the linear polyalkleneimines.

European Patent No. 403700 refers to the stability of silica gel as a support for affinity chromatography. This patent teaches the immobilisation of enzymes on a support comprising linear non-crosslinked polyethyleneimine of molecular weight 400–1800 covalently bound to silica particles of 200 microns or less. However, the stability required for an enzyme support is quite different to that required for a support which complexes heavy metals: Further, as discussed above, this small particle size is not suitable for many applications. For example, conditions used for binding heavy metals would normally destroy or denature enzymes.

Branched polyamines also bind strongly to a range of transition and other heavy metal ions. Studies on free (non-immobilised) branched polyethyleneimines show that the effective volume of the polymer varies according to pH. The polymer is large when the nitrogens are protonated due to repulsion, and contracts due to hydrogen bonding when the nitrogens are deprotonated.

The branching present in branched polyalkyleneimine can occur at its nitrogen moieties (as shown by the example of polyethyleneimine, see FIG. 1). The ratio of primary to secondary to tertiary amines present will depend upon the degree of branching and can, for example, be 1:2:1. In this case, the primary and tertiary amines would comprise half of the nitrogen groups in each molecule.

However, as mentioned above, it has hitherto not been thought to be possible to bind branched amines to a solid support having a large particle size so as to produce a product having a useful complexation capacity.

U.S. Pat. No. 5,190,660 to Lindoy and Eaglen discloses a technique for binding linear polyethyleneimine to silica gel. This patent aims to overcome the problems associated with the Ramsden patent in which the product was limited to silica of small particle sizes. U.S. Pat. No. 5,190,660 describes a method by which linear polyethyleneimine may be immobilised onto silica having particle sizes larger than that of the Ramsden patent. U.S. Pat. No. 5,190,660 makes a general statement that commercially available polyethyleneimines may contain a small amount of branched and cross-linked material as opposed to linear material. No attempt is made in the patent to isolate or define the properties of immobilised branched polyethyleneimine silica gel compositions and any non-linear product is treated more as a by-product or an impurity. The patent teaches away from any useful product which may be obtained from branched polyethyleneimines. The patent further does not make any reference to the stability of the product. As this patent is directed towards liner polyethyleneimines, the products described therein would presumably also have the above mentioned problems associated with lack of stability.

It would be desirable to be able to effectively link branched polyalkyleneimines with larger solid support particles, especially those having a size range from about 200 mesh to about 20 mesh, which corresponds to a diameter range of about 74 microns to about 850 microns. Such larger particles would enable bound branched polyalkyleneimines to be employed in applications requiring less pressure drop than is created with smaller particles. Thus, for example, large volume applications would be possible. Generally, large volume applications are benefited by maintaining a low pressure drop across the treatment bed.

It would also be desirable to obtain a product which is relatively stable under a wide range of operating conditions. Especially desirable is a product which may be regenerated without substantial efficiency loss.

After much trial and experimentation, new immobilised branched polyalkyleneimines have now been prepared, isolated and various useful applications have been found.

DISCLOSURE OF INVENTION

Figure 1:
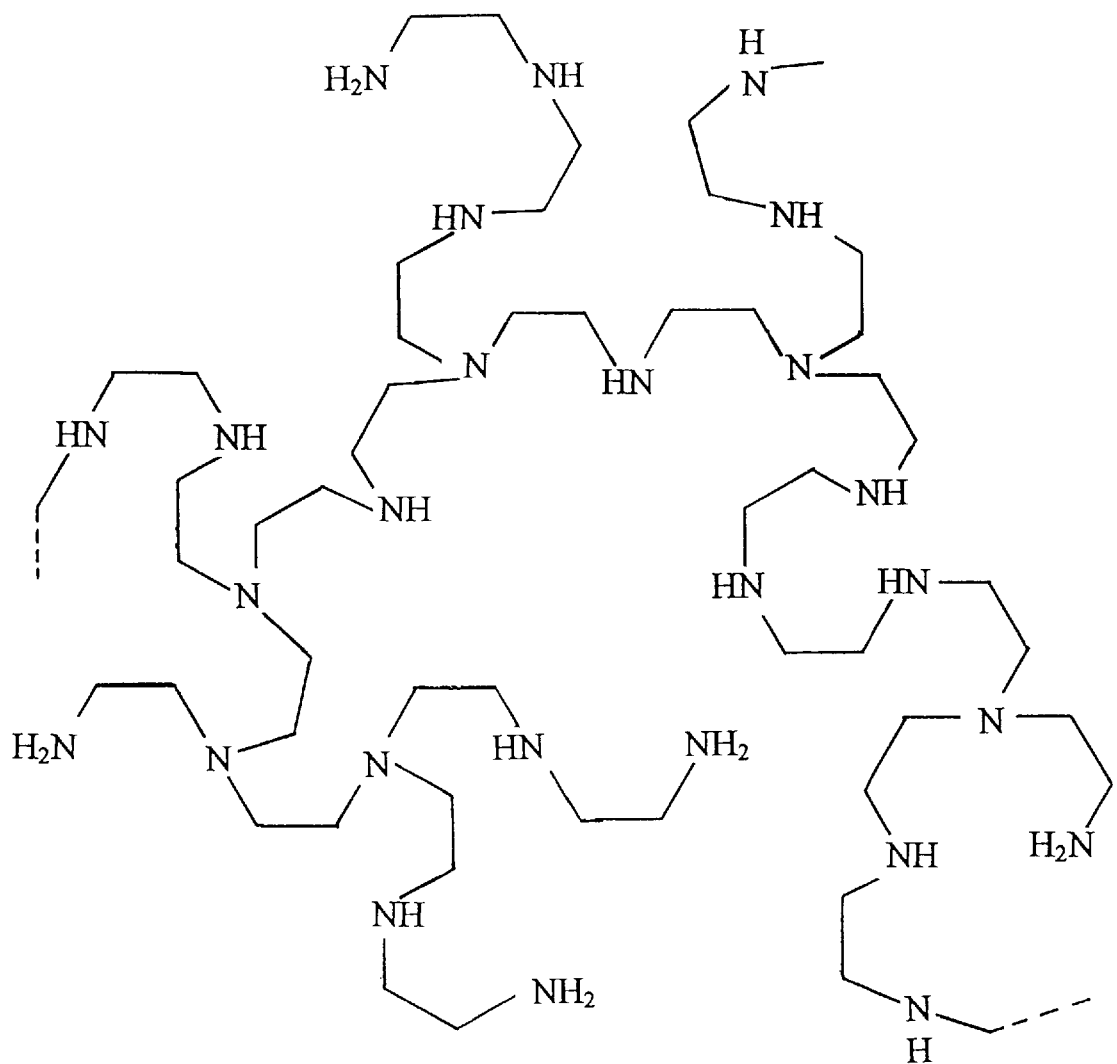
FIG. 1 is a drawing of the structure of polyethyleneimine.

In one form, the invention resides in a solid phase ligand comprising a branched polyalkyleneimine covalently bound to an inorganic solid support by a linking group.

In a second form, the invention resides in a method of at least partially removing metal ions from a solution containing metal ions comprising contacting said solution with the solid phase ligand as claimed in the first form until at least some of said metal ions are complexed with said ligand.

In a third form, the invention resides in a process for preparing a solid phase ligand including the steps of 1) modifying an inorganic support by reacting said support with a linking group and
2) reacting said modified inorganic support with a branched polyalkyleneimine to covalently bind said polyalkyleneimine to said support.

The branched polyalkyleneimine may be of the type given in formula 1

FORMULA 1

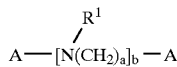

in which:

A may be the same or different and is selected from the group consisting of H, $NH_2$, $NHR^1$, $NR^1_2$, a linear amino, a branched amino, a linear alkylamino or a branched alkylamino group.

$R^1$ is selected from the group consisting of $(CH_2)_aNH_2$, $(CH_2)_aNHR^1$, $(CH_2)_aNR^1_2$, a linear amino, a branched amino, a linear alkylamino or a branched alkylamino group.

a is 1 to about 6; and b is 4 to about 2000.

Preferably b is chosen such that the branched polyalkyleneimine (BPAI) may have a molecular weight of between about 400 to about 100,000. Preferably, the polyalkyleneimine is selected from polyethyleneimine, polypropyleneimine, polybutyleneimine and polypentyleneimine. The polyalkyleneimine may also be a copolymer in which case if may have different values between 1 and 6. An especially preferred polyalkyleneimine is branched polyethyleneimine in which a is 2.

The branched polyalkyleneimine may include primary, secondary and tertiary amines the ratio of which will depend upon the degree of branching, and can for example be 1:2:1. A randomly branched polyalkyleneimine may be used. A preferred branched polyalkyleneimine may be branched polyethyleneimine (BPEI).

It is preferred that the polyalkyleneimine essentially consists of branched polyalkyleneimine although commercial sources may include an amount of linear polyalkyleneimine. A polyalkyleneimine having 50% or more by weight of branched product is preferred.

The inorganic solid support may be selected from silica gel, silicate materials, sand and other materials having surface hydroxyl groups including alumina, titania, zirconia, glass, sepiolite or zeolite.

Silica gel is a preferred support.

The polyalkyleneimine is immobilised onto the support via a linking group. The linking group may by any suitable linking group. Such linking groups are well known in the art. Preferably, the linking group is a silane as depicted in Formula 2.

FORMULA 2

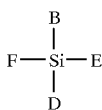

wherein B, D, E and F may be the same or different and are each selected from the group consisting of support-O, $CH_3$—O, $CH_3(CH_2)_c$—O, $CH_3$, $CH_3(CH_2)_c$, halogen or $(CH_2)_d$—X, with the proviso that at least one of B, D, E and F is a support-O, or a moiety which can react with the support, and that at least one of B, D, E and F is a leaving group. c is from to about 6, d is from 1 to about 20, and X is a leaving group such as a halogen.

Typically, the linking silane compound incorporates an alkyl group (such as a propyl chain) which will act as the "spacer" between the support and the amine groups of the branched polyalkyleneimine.

Preferably, B, D and F are $CH_3(CH_2)_c$—O and E is $(CH_2)_d$—X.

For example, a suitable linking group is a trialkoxysilane such as (3-chloropropyl)-trimethoxysilane.

The solid phase ligand may be prepared by first attaching the linking group to the branched polyalkyleneimine followed by attachment of the product to the support. Alternatively, the linking group can initially be attached to the support followed by reaction with the branched polyalkyleneimine. The branched polyalkyleneimine can be attached to the linking group via a carbon to nitrogen covalent bond to the linkage. To each branched polyalkyleneimine molecule many such carbon to nitrogen bonds can be present, multiply linking each branched polyalkyleneimine to the support.

Figure 2:
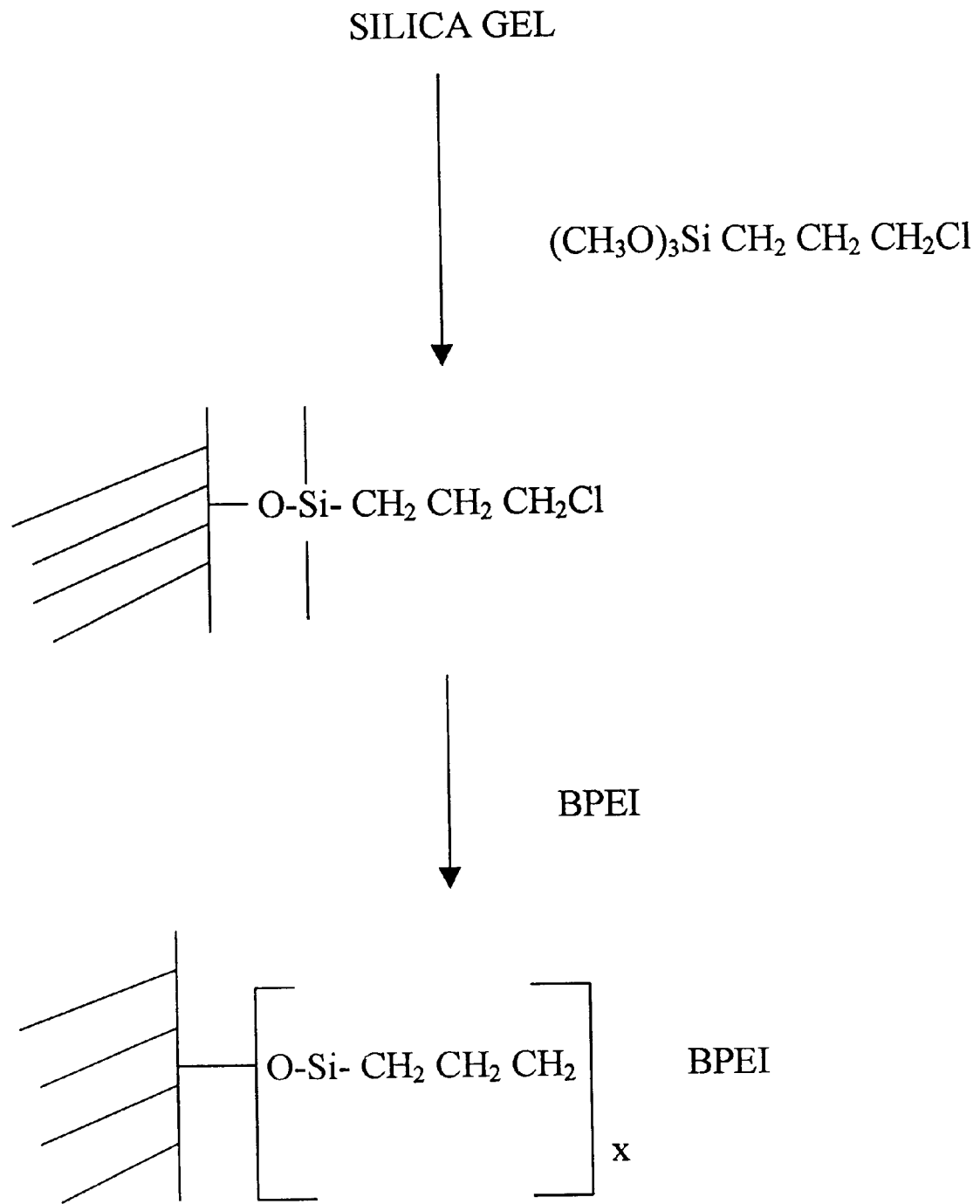
FIG. 2 is a drawing of a reaction scheme for attaching chemical species to the support surface.

In a preferred embodiment of the invention, the support (typically silica gel) is treated with a reagent of which (3-chloropropyl)-trimethoxysilane is typical, to attach a silane linking group to the support. The use of randomly branched polyalkyleneimine, as the immobilised ligand, can result in this moiety being covalently bonded to the support by, on average, a considerable number of linking groups. Binding of the branched polyalkyleneimine to the linking groups can occur through both the primary and secondary amine groups. Such an arrangement leads to a network of $(-CH_2)_a$ linked amine donor groups being distributed over the support surface, at suitable spacings, for binding to metal ions. Whilst not wishing to being bound by theory, it is postulated that coverage of the surface in this manner can give rise to enhanced chemical stability since it may result in restricted access of chemical species to the support surface. By this means the surface may be protected from hydrolysis and other types of degradation. An example, of the preferred preparation is depicted in FIG. 2.

Thus a preferred final immobilised branched polyalkyleneimine may be according to formula 3

FORMULA 3

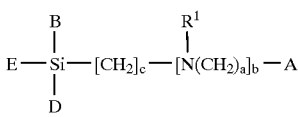

In formula (3):

B, D, and E may be the same or different and are each selected from the group consisting of support-0, $CH_3$0, $CH_3(CH_2)_d$—O, $CH_3$, $CH_3(CH_2)_d$ or halogen, with the proviso that at least one of B, D and E comprise support-O, A is selected from the group consisting of H, $NH_2$, $NHR^1$, $NR^1{}_2$, linear amino, branched amino, linear alkylamino or branched alkylamino group, $NH(CH_2)_c SiBDE$, $NR^1(CH_2)_c SiBDE$ or $N[(CH_2)_c SiBDE]_2$, $R^1$ is selected from the group consisting of $(CH_2)_a NH_2$, $(CH_2)_a NHR^1$, $(CH_2)_a NR^1{}_2$, $(CH_2)_c SiBDE$, $(CH_2)_a NH(CH_2)_c SiBDE$, $(CH_2)_a NR^1(CH_2)_c SiBDE$, $(CH_2)_a N[(CH_2)_c SiBDE]_2$, a is 1 to about 6;

b is 4 to about 2000;

c is 1 to about 20; and d is 1 to about 6.

For removal of preselected metal ions from solution, the immobilised branched polyalkyleneimine may be exposed to a solution containing the metal ions. This exposure is continued for sufficient time until at least some of the metal ions are complexed by the immobilised branched polyalkyleneimine.

The immobilised branched polyalkyleneimine composition is used to treat liquids by exposing the liquids to the immobilised branched polyalkyleneimine. One technique for achieving this exposure is to place the immobilised branched polyalkyleneimine in a column and pass the liquid through the column. A variation of this technique is to place the immobilised branched polyalkyleneimine in a bed where it can be fluidised. The bed can be fluidised by using a stream of the liquid. The liquid is then passed through the fluidised particles of the bed.

Ions that are complexed on the immobilised branched polyalkyleneimine may be removed by means of a separate treatment which will decomplex the complexed ions. For example, the metal loaded immobilised amines can be exposed to a stream of a second solution. The second stream may contain acid (including nitric acid, hydrochloric acid, sulfuric acid, sulphamic acid) or base (including ammonium hydroxide) or a reducing agent (including sodium thiosulphate) or a complexing agent that is soluble in the second stream (such as cyanide ions or ethylenediaminetetracetic acid). The choice of the regeneration chemical depends upon the ion being removed.

In most applications, it is desirable that the concentration of the specified ions in the regenerant be stream higher than the original, treated fluid stream. However, some applications are contrary to this. The regenerant solution can have a specified ion concentration lower than in the original treated fluid when, for example, it is desired that the specified ion in the regenerant solution be accompanied by fewer unwanted ions that were in the original, untreated, loading solution.

BEST MODES OF PERFORMING THE INVENTION

EXAMPLE 1

OPTIMISATION OF THE SYNTHETIC PROCEDURE

Using synthetic procedures similar to the preparations disclosed in example 2 [Steps (A) and (B)] (see below), the ratios of the reactants were altered in a stepwise manner in an attempt to optimise the amount of branched polyethyleneimine immobilised onto the silica gel. The amount of branched polyethyleneimine immobilised was determined using the nitrogen percentage obtained from duplicate nitrogen microanalyses. Metal ion loading studies using the immobilised branched polyethyleneimine were performed in the following manner. An aqueous solution of metal nitrate (5 to 20 mL) of known concentration (0.0005 to 0.3 mol/litre) was added to the branched polyethyleneimine modified silica beads (0.1 to 0.5 grams) obtained by the procedure given in example 2, and this mixture was shaken for fifteen (15) minutes. At the end of this time, the metal ion concentration of the solution, which was in equilibrium with the silica beads, was determined by atomic absorption spectrophotometry analysis. In all cases the initial metal ion concentration present was never less than the amount required to occupy all of the complexation sites on the modified silica. The metal ion uptake was determined from the difference in the metal ion concentration in the loading solution before and after loading. In all cases the results from duplicate experiments were found to fall within ten percent (10%) of each other. The results are shown in table 1.

Table 1: Optimisation of the amount of branched polyethyleneimine immobilised on silica gel through variation of reactant polyethyleneimine concentration in the general synthetic procedure given in example 2.

| Batch | Initial branched polyethyleneimine reactant concentration (mmol BPEI/g) | Immobilised branched polyehtyleneimine concentration in product (mmol BPEI/g) | Corresponding Cu(II) loaded (mmol Cu(II)/g) |
|---|---|---|---|
| 1 | 0.06 | 0.05 | 0.28 |
| 2 | 0.11 | 0.07 | 0.46 |
| 3 | 0.17 | 0.08 | 0.57 |
| 4 | 0.22 | 0.08 | 0.54 |

The maximum amount of branched polyethyleneimine that was immobilised onto the silica gel was 0.08 mmol of branched polyethyleneimine per gram of functionalised silica gel (batch 3 and 4 in table 1), which is equivalent to approximately 2.3 mmol of nitrogen per gram of functionalised silica gel. This gives a ratio of immobilised nitrogens to complexed copper(II) ions of approximately 4:1. The copper(II) nitrate loading capacity for this material was 0.57 mmol of metal ion per gram of functionalised silica gel.

EXAMPLE 2
PREPARATION OF IMMOBILISED BRANCHED POLYETHYLENEIMINE

This is a two (2) step (A and B) procedure: (A) To 50 grams of silica gel (Davison Chemical, grade 50, using particle sizes sieved to 850 to 500 microns, 20 to 35 mesh) suspended in 210 mL of xylene, 10 mL of distilled water was added to the mixture and the mixture was stirred for four (4) hours with a mechanical stirrer. To that mixture, 10 grams of (3-chloropropyl)-trimethoxysilane (HULS-America Inc) was added and the stirred suspension was heated at 80° C. for six (6) hours under a nitrogen atmosphere. The solvent was removed by vacuum filtration and the product was dried at 50° C. under vacuum. (B) A solution of 5 grams of branched polyethyleneimine (Aceto Corporation; Epomin sp-012, average molecular weight, 1200; approximate ratio of primary to secondary to tertiary nitrogens 1:2:1) as a solution in 5 grams of water, was added to 75 mL of methanol. This solution was then added to 25 grams of the modified silica gel prepared as described in (A). The suspension was refluxed without stirring, under a nitrogen atmosphere for twenty-two hours. The solution was removed by vacuum filtration and the product was washed with hot methanol then dried at 50° C. under vacuum.

Before use, the product from procedure (B) was preconditioned by two (2) washes with 50 mL of 0.05M $HNO_3$, two (2) washes with 50 mL of 0.05M $NaHCO_3$, followed by washing with distilled water, then dried at 50° C. under vacuum.

EXAMPLE 3
SELECTIVE LOADING OF METAL IONS FROM WATER

In commercial applications, it is often desired to remove heavy metal ions (including chromium, iron, cobalt, nickel, copper, zinc, cadmium, mercury, silver, tin, lead and radium) while not removing non toxic ions (including sodium, potassium, calcium and magnesium). The branched polyethyleneimine immobilised on silica gel does this very well. In order to illustrate the selectivity, the following tests were performed. A solution of distilled/millepore water was spiked with the following metal ions: nickel, copper, zinc, cadmium and lead (0.5 to 2 ppm). This solution was passed through a column of branched polyethyleneimine immobilised on silica gel (column dimensions 8 cm high×1 cm diameter, flow rate of approximately 1.5 mL/minute). Ten (10) samples were collected of 100 mL each: each sample was analysed by inductively coupled plasma mass spectrometry. The results obtained are shown in table 2.

Table 2: Results of metal ion removal from spiked water using immobilised branched polyethyleneimine in a column.

| Spiked Metal | Input metal ion concentration (ppb) | Output metal ion concentration* (ppb) |
|---|---|---|
| Cd(II) | 1408 | <0.1 |
| Cu(II) | 1727 | <1.6 |
| Ni(II) | 1204 | <1.5 |
| Pb(II) | 1823 | <0.4 |
| Zn(II) | 1327 | <8.6 |

*For each of the 10 samples, the attempted analysis of these samples indicated values which were less than the respective detectable limits.

EXAMPLE 4
SELECTIVE LOADING OF METAL IONS FROM SEAWATER

In a similar procedure to that disclosed in example 3, a solution of filtered natural seawater (filtered through 0.45 micron filters) was spiked with the following metal ions: nickel, copper, zinc, cadmium and lead (each approximately 0.5 to 2 ppm). This solution was passed through a column of branched polyethyleneimine immobilised on silica gel (column dimensions 8 cm high×1 cm diameter, flow rate of approximately 1.5 mL/minute). Ten (10) samples were collected of 100 mL each: each of these was analysed by inductively coupled plasma mass spectrometry. The results obtained are shown in table 3.

Table 3: Results of metal ion removal from spiked filtered seawater using immobilised branched polyethyleneimine in a column.

| Spiked Metal | Input metal ion concentration (ppb) | Output metal ion concentration* (ppb) |
|---|---|---|
| Cd(II) | 1327 | <0.1 |
| Cu(II) | 618 | <1.6 |
| Ni(II) | 746 | <1.5 |
| Pb(II) | 1785 | <0.4 |
| Zn(II) | 819 | <8.6 |

*For each of the 10 samples, the attempted analysis indicated values which were less than the respective detectable limits.

The concentrations of the heavy metal ions in the solutions after passing through the columns were all less than the detectable limits of the inductively coupled plasma mass spectrometer employed. This efficient level of extraction occurred even in the presence of the high concentrations of sodium, potassium, calcium and magnesium found in natural seawater (total competing metal ion concentrations 20,000 to 70,000 times greater than the initial spiked heavy metal ion concentrations).

EXAMPLE 5

RESISTANCE TO DEGRADATION OF THE IMMOBILISED POLYETHYLENEIMINE SYSTEM

The following procedures was used to compare the resistance to hydrolytic degradation of the immobilised branched polyethyleneimine system relative to the corresponding system incorporating the immobilised linear amine, diethylenetriamine. In prior experiments, both these immobilised systems were shown to have the same approximate maximum loading capacity for copper(II) [of 0.8 mmol/gram of immobilised ligand system]. Separate samples of known weight (0.95 gram) of each immobilised ligand system were separately exposed (with shaking) to a sodium hydroxide solution initially at pH 12 for 3, 24 and 72 hours, at 45° C. respectively. After this exposure, each immobilised system was removed from the base solution and washed with deionised water. The maximum loading capacity for copper (II) of the treated samples was then re-assessed and compared to their loading capacity before treatment. The results (expressed as a percentage of the original loading and based on the pre-treatment sample weight) are shown in Table 4 below.

Table 4: Final percentage loading capacities for copper(II) of the immobilised ligand systems (after treatment at pH 12 and 45° C. for the periods shown) relative to the copper(II) loadings of the corresponding (untreated) immobilised ligand systems. All percentages are calculated relative to the corresponding original (untreated) sample weights.

| Time | Immobilised Diethylenetriamine Loading | Immobilised Branched PEI Loading |
| --- | --- | --- |
| 3 hours | 46% | 92% |
| 24 Hours | 9% | 86% |
| 72 hours | <5% | 83% |

Visual inspection of the samples after the treatment with base also clearly showed that the respective volumes of the samples corresponding to immobilised diethylenetriamine were reduced relative to the corresponding samples incorporating branched polyethyleneimine—especially for the samples that had been treated with the sodium hydroxide solution for 24 or 72 hours. However, it was noted that some loss of volume was observed for each of the samples treated. Clearly, significantly greater degradation of the immobilised diethylenetriamine system (through enhanced dissolution of its bulk) was observed, relative to that for the immobilised branched polyethyleneimine system. Without being bound by theory it is postulated that multiple branching of the polyethyleneimine and its multiple links to the silica surface both serve to enhance the latter system's overall stability to degradation.

The examples establish that immobilised branched polyethyleneimine is an extremely effective and selective complexing material towards a range of heavy metals. When immobilised on silica gel or like supports, the branched polyethyleneimine has been transformed into a solid phase complexing material in which the branched polyethyleneimine is bound chemically, by covalent bonding, to the surfaces of silica. As a result, this branched polyethyleneimine silica compound is not soluble in water, is not washed off by water and can not dissolve in water. Consequently, the properties of branched polyethyleneimine can be applied in situations which are impractical for non-immobilised branched polyethyleneimine.

The foregoing is considered as illustrated only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

We claim:

1. A solid phase ligand for removing a metal cation from solution, said ligand comprising a branched polyalkyleneimine which has at least one tertiary amino group and at least one primary or secondary amino group, said polyalkyleneimine having a molecular weight of at least about 400, covalently bound to an inorganic support by a linking group.

2. The ligand as claimed in claim 1, wherein said branched polyalkyleneimine has the formula

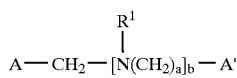

wherein:

A and A' may be the same or different and are selected from the group consisting of H, $NH_2$, a linear amino group, and a branched amino group;

$R^1$ is a linear amino or a branched amino group, wherein the $R^1$ linear amino group is selected from the group consisting of $(CH_2)_a NH_2$, $(CH_2)_a NHR^2$, and $(CH_2)_a NR^2_2$;

wherein $R^2$ is selected from the group consisting of a linear alkyl group and a linear amino group, wherein the linear amino group is selected from the group consisting of $(CH_2)_a NH_2$, $(CH_2)_a NHR^2$, and $(CH_2)_a NR^2_2$; and the $R^1$ branched amino group is selected from the group consisting of $(CH_2)_a NHR^3$, $(CH_2)_a NR^3 R^4$, and $(CH_2)_a NR^3_2$;

wherein $R^3$ is selected from the group consisting of a branched alkyl group and a branched amino group, wherein the branched amino group is selected from the group consisting of $(CH_2)_a NHR^3$, $(CH_2)_a NR^3 R^4$, and $(CH_2)_a NR^3_2$;

wherein $R^4$ is selected from the group consisting of a linear alkyl group, a branched alkyl group, a linear amino group, and a branched amino group, wherein the linear amino group is selected from the group consisting of $(CH_2)_a NH_2$, $(CH_2)_a NHR^2$, and $(CH_2)_a NR^2_2$;

and wherein the branched amino group is selected from the group consisting of $(CH_2)_a NHR^3$, $(CH_2)_a NR^3 R^4$, and $(CH_2)_a NR^3_2$;

a is 1 to about 6; and b is 4 to about 2000.

3. The ligand as claimed in claim 2, wherein said branched polyalkyleneimine is selected from the group consisting of branched polyethyleneimine, branched polypropyleneimine, branched polybutyleneimine and branched polypentyleneimine.

4. The ligand as claimed in claim 3 wherein the polyalkyleneimine is covalently bound to the inorganic support by two or more linking groups.

5. The ligand as claimed in claim 3, wherein said branched polyalkyleneimine has a molecular weight of about 400 to about 100,000.

6. The ligand as claimed in claim 1, wherein said inorganic support is selected from silicate, silica gel, sand, alumina or glass.

7. The ligand as claimed in claim 6 wherein said inorganic support is particulate and has an average particle size of 200 microns or more.

8. The ligand as claimed in claim 6 wherein said linking group has the formula

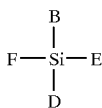

wherein B, D, E and F may be the same or different and are each selected from the group consisting of $CH_3$—O, $CH_3(CH_2)_c$—O, $CH_3$, $CH_3(CH_2)_c$, halogen or $(CH_2)_d$—X, with the proviso that at least one of B, D, E and F is a moiety which can react with the support, and that at least one of B, D, E and F is a leaving group, c is from 1 to about 6, d is from 1 to about 20, and X is a leaving group.

9. The ligand as claimed in claim 8 wherein B, D and F are $CH_3(CH_2)_c$—O and E is $(CH_2)_d$—X.

10. A solid phase ligand for removing a metal cation from solution, comprising an inorganic support, a linking group, and a ligand covalently bound to said inorganic support by said linking group, said ligand comprising a branched polyalkyleneimine, wherein said branched polyalkyleneimine is branched polyethyleneimine having a molecular weight of about 50,000, said linking group is (3-chloropropyl)-trimethoxysilane and said inorganic support is silica gel having a particular size of 500 to 850 μm.

11. The ligand as claimed in claim 4, which has a formula

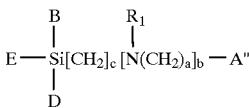

B, D, and E may be the same or different and are each selected from the group consisting of support—O, $CH_3O$, $CH_3(CH_2)_d$—O, $CH_3$, $CH_3(CH_2)_d$ and halogen, with the proviso that at least one of B, D and E comprise support—O, A" is selected from the group consisting of H, $NH_2$, linear amino groups, branched amino groups, $NH(CH_2)_c$SiBDE, $NR^1(CH_2)_cSiBDE$ and $N[(CH_2)_cSiBDE]_2$, $R^1$ is selected from the group consisting of $(CH_2)_aNH_2$, $(CH_2)_aNHR^2$, $(CH_2)_aNR^2_2$, $(CH_2)_aNHR^3$, $(CH_2)_aNR^2R^3$, $(CH_2)_aNR^3_2$; $(CH_2)_cSiBDE$, $(CH_2)_aNH(CH_2)_cSiBDE$, $(CH_2)_aNR^1(CH_2)_cSiBDE$, and $(CH_2)_aN[(CH_2)_cSiBDE]_2$, wherein $R^2$ is selected from the group consisting of a linear alkyl group and a linear amino group, wherein the linear amino group is selected from the group consisting of $(CH_2)_aNH_2$, $(CH_2)_aNHR^2$, and $(CH_2)_aNR^2_2$;

wherein $R^3$ is selected from the group consisting of a branched alkyl group, and a branched amino group, wherein the branched amino group is selected from the group consisting of $(CH_2)_aNHR^3$, $(CH_2O)_aNR^3R^4$, and $(CH_2)_aNR^3_2$;

wherein $R^4$ is selected from the group consisting of a linear alkyl group, a branched alkyl group, and a branched amino group, wherein the linear amino group is selected from the group consisting of $(CH_2)_aNH_2$, $(CH_2)_aNHR^2$, and $(CH_2)_aNR^2_2$;

and wherein the branched amino group is selected from the group consisting of $(CH_2)_aNHR^3$, $(CH_2)_aNR^3R^4$, and $(CH_2)_aNR^3_2$;

a is 1 to about 6, b is 4 to about 2000, c is 1 to about 20, and d is 1 to 6.

12. A process for preparing a solid phase ligand including the steps of:

1) modifying an inorganic support by reacting said support with a linking group and 2) reacting said modified inorganic support with a branched polyalkyleneimine to covalently bind said polyalkyleneimine to said support such that said polyalkyleneimine is bound to two or more of said linking groups, said branched polyalkyleneimine having a molecular weight of at least about 400 and having the formula

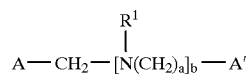

wherein A and A' may be the same or different and are selected from the group consisting of H, $NH_2$, a linear amino, and branched amino group;

$R^1$ is a linear amino or a branched amino group, wherein the $R^1$ linear amino group is selected from the group consisting of $(CH_2)_aNH_2$, $(CH_2)_aNHR^2$, and $(CH_2)_aNR^2_2$;

wherein $R^2$ is selected from the group consisting of a linear alkyl group and a linear amino group, where the linear amino group is selected from the group consisting of $(CH_2)_aNH_2$, $(CH_2)_aNHR^2$, and $(CH_2)_aNR^2_2$;

wherein the $R^1$ branched amino group is selected from the group consisting of $CH_2)_aNHR^3$, $(CH_2)_aNR^3R^4$, and $(CH_2)_aNR^3_2$;

wherein $R^3$ is selected from the group consisting of a branched alkyl group, and a branched amino group, wherein the branched amino group is selected from the group consisting of $(CH_2)_aNHR^3$, $(CH_2)_aNR^3R^4$ and $(CH_2)_aNR^3_2$;

and wherein $R^4$ is selected from the group consisting of a linear alkyl group, a branched alkyl group, and a branched amino group, wherein the branched amino group is selected from the group consisting of $(CH_2)_aNHR^3$, $(CH_2)_aNR^3R^4$, and $(CH_2)_aNR^3_2$;

a is 1 to about 6; and b is 4 to about 2000.

13. A method of at least partially removing metal cations from a solution containing metal cations comprising contacting said solution with the solid phase ligand as claimed in claim 1 until at least some of said metal cations are complexed with said ligand.

14. The method as claimed in claim 13 which further comprises decomplexing said metal ions from said ligand.

15. A solid phase ligand for removing a metal cation from solution, comprising an inorganic support, a linking group, and a ligand covalently bound to said inorganic support by said linking group, said ligand comprising a branched polyalkyleneimine covalently bound to an inorganic support by a linking group, said polyalkyleneimine having a molecular weight of at least about 400 and having the formula

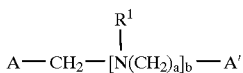

wherein A and A' may be the same or different and are selected from the group consisting of H, $NH_2$, a linear amino group, and a branched amino group; $R^1$ is a linear amino group or a branched amino group, wherein the $R^1$ linear amino group is selected from the group consisting of $(CH_2)_a NH_2$, $(CH_2)_a NHR^2$, and $(CH_2)_a NR^2_2$;

wherein $R^2$ is selected from the group consisting of a linear alkyl group and a linear amino group, where the linear amino group is selected from the group consisting of $(CH_2)_a NH_2$, $(CH_2)_a NHR^2$, and $(CH_2)_a NR^2_2$; the $R^1$ branched amino group is selected from the group consisting of $(CH_2)_a NHR^3$, $(CH_2)_a NR^3 R^4$, and $(CH_2)_a NR^3_2$;

wherein $R^3$ is selected from the group consisting of a branched alkyl group, and a branched amino group, wherein the branched amino group is selected from the group consisting of $(CH_2)_a NHR^3$, $(CH_2)_a NR^3 R^4$, and $(CH_2)_a NR^3_2$; and wherein $R^4$ is selected from the group consisting of a linear alkyl group, a branched alkyl group, a linear amino group, and a branched amino group, wherein the linear amino group is selected from the group consisting of $(CH_2)_a NH_2$, $(CH_2)_a NHR^2$, and $(CH_2)_a NR^2_2$;

wherein the branched amino group is selected from the group consisting of $(CH_2)_a NHR^3$, $(CH_2)_a NR^3 R^4$, and $(CH_2)_a NR^3_2$;

a is 1 to about 6;

and b is 4 to about 2000.

16. The ligand as claimed in claim 2, wherein said A or A' linear amino group is an alkylamino group and said A or A' branched amino group is a branched alkylamino group.

17. The ligand as claimed in claim 11, wherein said A" linear amino group is an alkylamino group and said A" branched amino group is a branched alkylamino group.

18. The process as claimed in claim 12, wherein said A or A' linear amino group is an alkylamino group and said A or A' branched amino group is a branched alkylamino group.

19. A method of selectively removing at least one cation selected from the group consisting of chromium, iron, cobalt, nickel, copper, zinc, cadmium, mercury, silver, tin, lead and radium from a solution which comprises at least one metal selected from the group consisting of sodium, potassium, calcium, and magnesium, said method comprising contacting said solution with the solid phase ligand as claimed in claim 1 until said at least one cation is complexed with said ligand.

20. A solid phase ligand for removing a metal cation from solution, said ligand comprising branched polyethyleneimine having a molecular weight of at least about 400 covalently bound to silica gel.

21. The solid phase ligand of claim 20 wherein said polyethyleneimine has a molecular weight of about 50,000, said silica gel has a particle size of between about 500 to 850 μm, and said polyethyleneimine is covalently bound to silica gel.

22. A solid phase ligand comprising branched polyalkyleneimine bound to an inorganic support by at least two linking groups.

* * * * *